E. VON LEPEL.
METHOD FOR PRODUCING ELECTRICAL OSCILLATIONS OF HIGH FREQUENCY FROM DIRECT CURRENT.
APPLICATION FILED APR. 7, 1914.
1,224,048.   Patented Apr. 24, 1917.
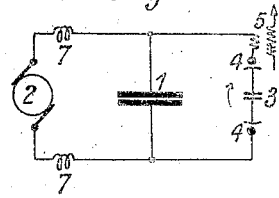
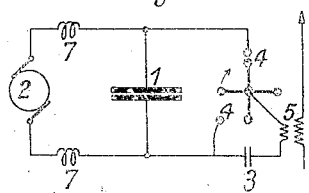
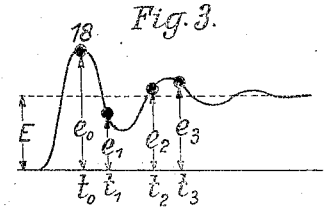
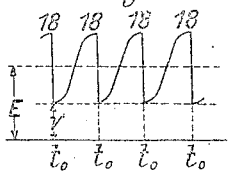
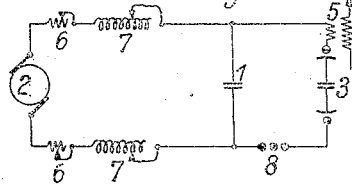
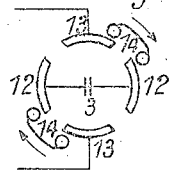
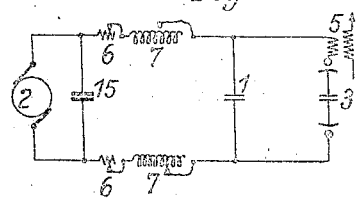
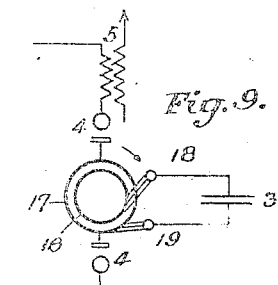
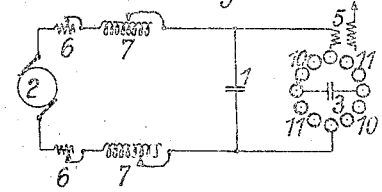

UNITED STATES PATENT OFFICE.

EGBERT von LEPEL, OF BERLIN-WILMERSDORF, GERMANY.

METHOD FOR PRODUCING ELECTRICAL OSCILLATIONS OF HIGH FREQUENCY FROM DIRECT CURRENT.

1,224,048.

Specification of Letters Patent.

Patented Apr. 24, 1917.

Application filed April 7, 1914. Serial No. 830,268.

*To all whom it may concern:*

Be it known that I, EGBERT VON LEPEL, a subject of the King of Prussia, residing at Berlin-Wilmersdorf, in the Empire of Germany, have invented new and useful Improvements in Methods for Producing Electrical Oscillations of High Frequency from Direct Current by Changing the Charge of a Condenser, of which the following is a specification.

The application of commutators for producing electrical oscillations has been known for a number of years.

In the accompanying drawings I have illustrated in a diagrammatical manner different systems for producing electrical oscillations of high frequency from direct current, which are specifically referred to in the description hereinafter.

Figures 1 and 2 illustrate arrangements such as are usually employed with known methods.

Figs. 3 and 4 are curves illustrating the theory underlying my present invention.

Fig. 5 illustrates a system embodying my present invention for producing electrical oscillations of high frequency.

Fig. 6 is a modification of the system shown in Fig. 5.

Fig. 7 shows a special construction of commutator employed in accordance with my present invention and having stationary electrodes and rotating short circuiting members.

Fig. 8 shows a system in which the commutation is performed by means of artificial ignition; and Fig. 9 illustrates a combination of rotating electrodes with a stationary blocking condenser.

In most cases as shown in the first two figures a reservoir condenser 1 is arranged which is fed from the source of direct current 2 and rhythmically discharged in an oscillatory circuit. In this way the discharge takes place either in accordance with Fig. 1 by a periodical change of charge, or in accordance with Fig. 2 by periodically charging and discharging a blocking condenser 3. The commutator is formed by a revolving spark gap 4. The coupling coil 5 transmits the oscillating energy of high frequency to the circuit of antenna. Into the supply circuit choking coils 7 are inserted in a usual manner for the purpose of protecting the source of current from returning high frequency energy.

These arrangements can only work steadily if the capacity of reservoir condenser 1 is very large in comparison to the capacity of the blocking condenser 3. Theoretically, a state of perfect steadiness is obtained only if the proportion of the capacities is infinitely large, for the following reason. By the self induction of the supply means which self induction is further increased by the impedance of the protecting choking coils 7 the feeding of the condenser 1 follows an oscillatory course. Thus, for instance, on charging the initially perfectly discharged condenser 1 the potential of the condenser $e$ will in accordance with diagram 3, oscillate far above the value of the feeding potential E until the point 18 is reached; then the oscillation gradually decreases to the value E. If on the sufficient approach of the electrodes the change of charge is effected at about the moment $t$, the potential of the condenser at the moment the spark jumps equals $e_1$ as may be inferred from the diagram. To each other moment $t_2$ $t_3$ $t_4$ corresponds another potential $e_2$ $e_3$ $e_4$. On further pursuing the electrical phenomenon it appears that by methods of this kind not only disuniform discharging potentials would result but also the rhythm of discharge would become disuniform, and even would stop sometimes, or partial discharges would occur. On the other hand if the condenser 1 is comparatively large in comparison to the blocking condenser only a small portion of the charges is consumed with each spark with the result that the fluctuation of the potential decreases. The operation becomes the more regular the larger condenser 1 is in comparison with the blocking condenser 3. Apparently this has also been found by experiments in cases where a clear conception of the phenomenon was missing for the requirement to increase as far as possible the condenser 1 in comparison to the blocking condenser 3 may be found in almost all papers dealing with this and similar methods.

As a matter of course the use of condensers which ought to have a capacity of a far higher order than the blocking condenser is economically and practically so difficult as to exclude the application of these methods from actual practice. It is true that a uniform operation may be obtained by starting the periodical spark discharges not until the supply oscillations have fully decreased, with the result that at the moment of the commutation the condenser receives the supply potential E. Since with the oscillatory charge of a condenser always exactly half of the energy supplied is lost this system yields an uneconomical effect.

By means of the novel method hereinafter described a perfectly steady operation and a good efficiency is obtained notwithstanding the fact that a condenser is employed of a capacity not larger, or not essentially larger, than the capacity of the blocking condenser.

The method consists in choosing both condensers of a capacity of an equal order and tuning the supply circuit in such a way to the rhythm of the sparks that the high frequency energy obtained on equalizing the potential of both condensers and incidentally the energy derived from the source of current will be proportional to the square of twice the supply potential.

This is made possible if the condensers connected in series at the moment of the spark are given a total potential that is twice as large as the supply potential; for only in this case the effect will correspond to the square of twice the supply potential.

With the old method according to Fig. 1 this demand is complied with; however, only by using a condenser 1 of theoretically infinite size. In this way the blocking condenser is charged to the full potential of condenser 1, that is, to the full supply potential, and offers this potential for the next spark in an inverted position with the result that an initial spark potential of twice the value of the supply potential is produced.

According to the new method the requirement as explained above is complied with by using condensers of equal or similar capacity by tuning the supply circuit accordingly. From the diagram shown in Fig. 3 it will be observed that the first oscillation emitted produces an initial spark potential of almost twice the value of the supply potential if the spark is produced at the moment $t_0$ corresponding to the extreme value of the oscillating potential, or if the lengths of the waves of the oscillations in the supply circuit are chosen in a way that the latter will reach their extreme value just at the moment the spark is produced. The wave length $\lambda_0$ corresponding to this condition will be called hereafter "critical wave length." After the oscillation has come to rest the potential of condenser 1 will not again come to zero but assumes the value of the equalized potential V changing diagram 3 to diagram 4 during the operation. The initial spark potential equals in this case also the total of the maximum potential prevailing in condenser 1 at the moment of the spark, and also the potential V offered by the inverted blocking condenser. If the capacity of both condensers is perfectly equal for both potentials the value 1 E and $1\frac{1}{2}$ E will be obtained by way of calculation so that their total potential again equals twice the supply potential.

For the purpose of applying the idea of this invention adjustable self induction or choking coils 7 (Fig. 5) of sufficient size are inserted into the supply-circuit, and with a given speed of the commutating device the self-induction is increased to such a degree that the "critical wave length" $\lambda_0$ or a larger wave length $\lambda_0 + \Delta \lambda$ results. The supply circuit must always be tuned in accordance with the speed of the commutating device. This tuning effect may be easily obtained by the insertion of a sufficiently large self induction, for it is not necessary, as already mentioned, to rely upon an accurate tuning of the critical wave length $\lambda_0$, but a larger wave length may also be chosen.

In this latter case also uniformity is obtained but not so with a smaller wave length; because with all smaller wave lengths the maximum of oscillation 18 is already formed prior to the occurring of the spark, whereby the further course of oscillation is determined. With all larger wave lengths, however, the oscillation is brought to a stop before the maximum is reached, that is in that part of the curve that is ascending toward point 18. Thereby the curve for the next charge is enabled to adjust itself to the rhythm of the discharges.

Marconi has proposed and applied a tuning of the supply circuit, but under different conditions and for a different purpose. For a description of Marconi's system, reference may be had to U. S. Patent 954,640 and British Patents 20,119 of 1907 and 18,524 of 1909. A description will also be found in Zenneck's book entitled "Lehrbuch der drahtlosen Telegraphie", 1913, § 118, pages 241 to 247. With Marconi's arrangement the condenser provided in the oscillatory circuit is temporarily discharged by means of a fast rotating short circuiting wheel, by which at the same time the source of current is also short circuited, a quickly increasing current starting with each discharge. To prevent a too violent action of the short circuit Marconi tunes the supply circuit so that the supply current oscillates through the zero value at the moment the short circuit occurs, and in addition he makes the short circuiting wheel rotate with such extraordinary speed that the arcs of the short circuit that are forming will be ruptured in time. If the short circuiting wheel would go slower violent short circuits would occur in spite of the tuning. Hence, the tuning nections are made and broken by artificial ignition or prevention of the sparks, such devices consisting essentially of a number of stationary electrodes, pairs of which are bridged alternately by auxiliary sparks, whereby the current is caused to change its way each time. Such spark gaps have already been used in place of normal switches.

It is therefore irrelevant for the purpose of the present invention whether the dielectrical strength of the air space between the electrodes is diminished by approaching the latter or whether this diminishing is obtained by artificial ignition, namely by ionization. It is only essential that the potential of the oscillatory circuit at the moment of the discharge, that may be started by either of the described methods, possesses approximately the double value of the potential of the supplying dynamo or mains.

The diagram of Fig. 8 may be used in connection with the artificial ignition. The electrodes 10, 10, 11, 11, are artificially ionized alternately.

It is evident that in this way the blocking condenser is periodically commutated, each commutation producing a train of electrical oscillations.

By means of the adjustable self induction coil 7 the supply circuit is tuned, in the manner described above, to the rhythm of the sparks, i. e. to the rhythm of the artificial ionization.

Should any disturbing influences of the gradually decreasing wave trains upon the new starting ones occur it will be of advantage to choose the frequency of the supply circuit in such a way that it corresponds not only to the rhythm of the sparks but at the same time to an even fraction of the number of the high frequency oscillations.

The rotary commutating device can be rendered fit for combination with artificial ignition if the discharge circuit is so arranged that even the maximum potential difference which is attained in the moment of the completion of the mechanical commutation does not suffice to cause the discharge. Then, it is possible by means of additional auxiliary potentials, or ionizations, produced in the rhythm of the commutator, to start the oscillatory discharge with great precision at any desired position of the commutator, for instance when both electrodes actually present each other their full surfaces.

What I claim is:

1. In a system of the class described comprising a source of current with tuning means connected to an oscillation circuit containing a spark gap, reservoir condenser and blocking condenser, the condensers having capacities of an equal order, the herein described method of producing electrical oscillations of high frequency which consists in charging the reservoir condenser, closing the circuit through the spark gap and blocking condenser to produce a train of sparks, and so tuning the feeding current with respect to the rhythm of the train of sparks that, at the moment of ignition, the condensers will produce a resulting spark potential which is substantially equal to double the value of the feeding potential.

2. In a system comprising a source of direct current with tuning means connected to an oscillation circuit containing a spark gap, a reservoir condenser and blocking condenser, the condensers having capacities of an equal order, the herein described method of producing electrical oscillations of high frequency which consists in charging the reservoir condenser, closing the oscillation circuit periodically through the spark gap and blocking condenser to produce a train of sparks, and so tuning the feeding current with respect to the rhythm of the train of sparks that, at the moment of ignition, the condensers will produce a resulting spark potential equal to double the value of the feeding potential.

3. In a system comprising a source of direct current with tuning means connected to an oscillation circuit containing one or more spark gaps having a constant gap length, one or more spark gaps having a periodically variable gap length, a reservoir condenser charged by said source of current, and a blocking condenser, said condensers having capacities of an equal order, the herein described method of producing electrical oscillations of high frequency which consists in charging the reservoir condenser, closing the oscillation circuit periodically through the spark gaps and blocking condenser to produce a train of sparks, and so tuning the feeding current with respect to the rhythm of the train of sparks that, at the moment of ignition, the condensers will produce a resulting spark potential equal to double the value of the feeding potential.

4. In a system for producing high frequency electrical oscillations, the combination of a source of direct current, an oscillation circuit including a reservoir condenser charged by said source of current, a spark gap, a blocking condenser, and means for closing the oscillation circuit to produce a train of sparks, said condensers having capacities of the same order, and means for tuning the direct current supply with respect to the rhythm of the train of sparks to produce a resulting spark potential which is equal to double the value of the feeding potential.

5. In a system for producing high frequency electrical oscillations, the combination of a source of current, a reservoir condenser charged by said source of current, a blocking condenser, said condensers having capacities of an equal order, means for closis to be considered an additional factor only to increase the short circuiting preventing effect obtained by the extraordinary high speed of the contacts.

With the new method any danger of short circuit is prevented *a priori* on account of the blocking condenser preventing perfectly any after spark discharge, any short circuit and any partial discharge, even if the rotating commutator wheel would be suddenly stopped.

While Marconi's intention is to favorably influence the phenomenon of rupture by way of tuning the supply circuit, according to the new method this tuning serves solely for controlling the start of the sparks.

The relation of the new method toward those already known will be cleared by regarding Marconi's short circuiting wheel a condenser of infinitely large capacity.

From this point of view it will be seen that while on the one side an infinitely large condenser 1 is required in addition to the blocking condenser of normal size Marconi on the other side uses a blocking condenser of infinite capacity, namely the short circuiting wheel, in connection with a normal supply condenser. With regard to these proportions of capacities the new method takes its place between them, for in this case both condensers are principally provided with capacities of equal order. The main advantage obtained is, on the one hand, the possibility of using comparatively small condensers, on the other hand, the prevention of short circuits and arc formation.

The energy derived from the source of current and fed to the high frequency circuit may for the new method, proper coupling provided, be computed in accordance with the formula $$\frac{nc(2E)^2}{2} \text{ watts}$$

in which formula $c$ represents the resulting capacity of both condensers given in microfarads, $E$ the supply potential given in kilo-volts, and $n$ the number of sparks per second.

Since small irregularities in the rhythm cannot always be avoided, it may be useful to insert a small damping resistance 6 (Fig. 5) adjusted to the degree of such irregularities. This resistance has a damping influence on the supply oscillations and renders the tuning less sensitive for inaccuracies.

For the purpose of handling high tensions by means of revolving spark gaps it has been proposed to work them in compressed air. Experiments have proved that the same purpose may be attained in a much more perfect and convenient way by means of spark gaps connected in series. These discharge gaps may, like the rotating spark gaps, be constructed as quenching spark gaps. It is advantageous to have them constructed in a way that the extension caused by the produced heat is as far as possible automatically compensated for retaining the lengths of the discharge gaps unaltered. Under circumstances the use of revolving disk-gaps or roller-gaps is expedient.

The mode of connection shown in Fig. 6 differs from those which have been described so far by an additional condenser 15 connected in parallel to the source of current. This condenser is not only to release as far as possible the dynamo of oscillations, but to afford a tuning even if the conditions of the source of current, or feeding mains, with regard to self induction and damping are unfit for that purpose.

However, protecting condensers, arranged in parallel to the source of current, are generally known. Their purpose is to prevent detrimental influences of the high frequency circuit upon the dynamo. The condenser 15 serves, on the contrary, the purpose of protecting the transmitting arrangement from the influences caused by the dynamo or the supplying main and detrimental to the tuning.

In Figs. 1, 5, 6 the blocking condenser 3 is, for the sake of simplicity, shown as if directly connected to the moving electrodes. In most cases it is not expedient to actually rotate the condenser with the electrodes. It is preferable to arrange the condenser stationary and to connect it with the revolving spark-gaps by means of brushes and slip-rings, as illustrated diagrammatically in Fig. 9. In this case, the revolving electrodes forming with the operatively disposed stationary electrode the spark gap 4, 4 are connected with the slip rings 16 and 17 upon which slide the brushes 18 and 19 connected with the stationary blocking condensers 3.

Fig. 7 shows that stationary segment electrodes might be arranged and that the blocking condenser might be commutated by means of rotating members 14. The movable members 14 revolve concentrically to the stationary pairs of electrodes 12, 12, and 13, 13; thus, in the position illustrated in Fig. 7, the upper electrode 13 is connected to the right hand electrode 12, while the lower electrode 13 is connected to the left hand electrode 12. The members 14 having traveled a quarter turn, the mode of connection is reversed: the upper electrode 13 is connected to the left hand electrode 12, while the lower electrode 13 is connected to the right hand electrode 12; this results in the blocking condenser 3 being charged with constantly changing polarity.

The new method comprises not only commutating devices having moving electrodes but also commutating devices in which coning a circuit through said condensers to discharge the reservoir condenser and produce a train of oscillations, and means for tuning the feeding current with respect to the rhythm of the train of oscillations.

6. In a system for producing high frequency electrical oscillations, the combination of a source of direct current, an oscillation circuit including a reservoir condenser charged by said source of current, one or more spark gaps having a periodically variable gap length, one or more spark gaps having a constant gap length, a blocking condenser, and means for closing the oscillation circuit to produce a train of sparks, said condensers having capacities of an equal order, and means for tuning the direct current supply with respect to the rhythm of the train of sparks to produce a resulting spark potential which is equal to double the value of the feeding potential.

7. In a system for producing high frequency electrical oscillations, the combination of a source of direct current, a reservoir condenser charged by said source of current, a spark gap, a blocking condenser, said condensers having capacities of an equal order, means for closing a circuit through said condensers to discharge the reservoir condenser and produce a train of sparks, means for tuning the heating current with respect to the rhythm of the train of sparks, and a third condenser of a higher order than the reservoir and blocking condensers in parallel with the source of direct current.

8. In a system for producing high frequency electrical oscillations, the combination of a source of direct current, an oscillation circuit including a reservoir condenser charged by said source of current, spark gaps having a periodically variable gap length, other spark gaps having a constant gap length, a blocking condenser between said other spark gaps, and means for closing the oscillation circuit to produce a train of sparks, said condensers having capacities of the same order, and means for tuning the direct current supply with respect to the rhythm of the train of sparks to produce a resulting spark potential which is equal to double the value of the feeding potential.

EGBERT von LEPEL.

Witnesses:
 WOLDEMAR HAUPT,
 HENRY HASPER.